March 11, 1947. D. B. COLLINS 2,417,152
OIL WELL SCREEN
Filed March 14, 1944
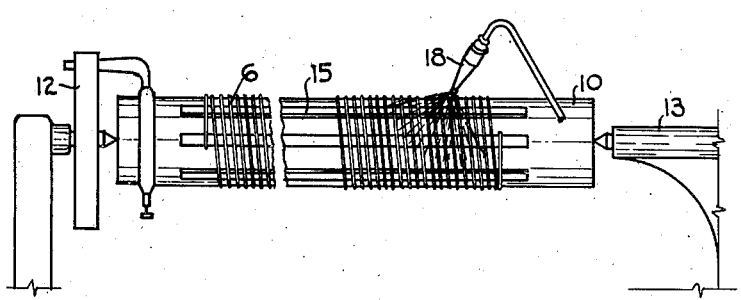
Fig. 4
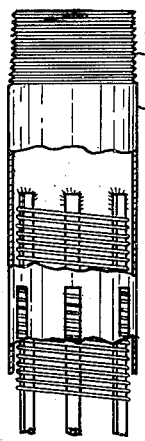
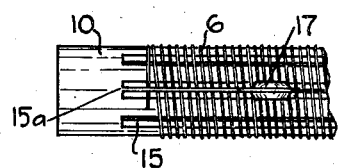
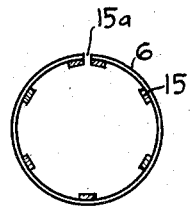
Fig. 5   Fig. 6
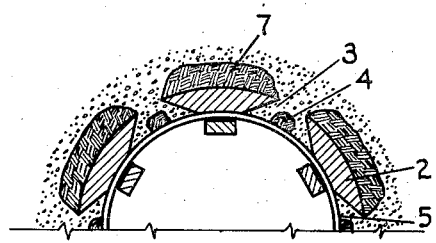
Fig. 3
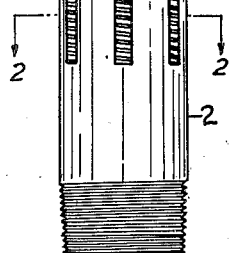
Fig. 1
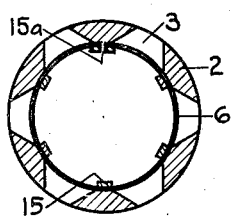
Fig. 2
Inventor: Donald B. Collins, dec'd,
by Bessie May Collins, Executrix.
By his Attorney:

Patented Mar. 11, 1947

2,417,152

UNITED STATES PATENT OFFICE 2,417,152

OIL WELL SCREEN

Donald B. Collins, deceased, late of Houston, Tex., by Bessie May Collins, executrix, Houston, Tex., assignor to Shell Development Company, San Francisco, Calif., a corporation of Delaware Application March 14, 1944, Serial No. 526,397

3 Claims. (Cl. 166—8)

This invention pertains to well screens for use in petroleum production operations.

In an oil well, under conditions usually encountered when setting screens, the walls of the borehole are covered with a mud sheath or filter cake. The screen, after being set, is usually washed on the outside prior to permitting the well to produce from the oil bearing horizon. Evidence shows, however, that at the time the flow starts from said horizon, the filter cake tends, to a large extent, to be detached from the well walls, and to be transferred from the interior of the borehole to the outside of the screen, thus clogging the strainer wires. This results in limited effectiveness and premature wearing of the screens or strainers, and in considerable expense in removing and replacing them.

In some cases, moreover, wire wrapped strainers or screens may become damaged during setting by actual contact with the walls of the borehole or metallic equipment installed therein.

It is therefore an object of this invention to provide an improved screen comprising an outer slotted tubular shield member and an inner wire wrapped cylindrical strainer member arranged so that a major portion of the straining surface of the inner member will remain open to fluid flow, since only a small portion of the strainer wire can be clogged by direct impact of that portion of the filter cake which can penetrate the outer shield member.

It is also an object of this invention to provide a simple and ready method of manufacturing well screens of the above description.

These and other objects of this invention will be understood from the following description taken with reference to the attached drawings, wherein:

Fig. 1 is a view, partly in cross-section, of the present screen when assembled;

Fig. 2 is a cross-section view taken along line 2—2 of Fig. 1;

Fig. 3 is a diagrammatic view illustrating the action of the present screen in preventing clogging;

Figs. 4 and 5 are diagrammatic views illustrating the process of manufacturing the present screen;

Fig. 6 is a cross-section view of the wire-strainer member of the present screen, taken at right angles to its axis.

Referring to Fig. 1, the present screen consists of an outer tubular shield member 2, provided with slots 3, which are formed so that their outside width is small as compared with their inside width, as clearly shown in Fig. 2.

Although it has been known to use tubular screens provided with undercut slots to permit sand grains, of a size which will pass the orifice, to traverse the slot without bridging it, the undercut in such cases does not usually exceed an angle of 3 degrees to a radial line. The object of the present screen, on the other hand, is to provide an undercut such that the area of the slots on the inner circumference of the tube 2 is several times that measured on its outer circumference even with thin walled tubes. This arrangement as shown in Fig. 3, permits the clogging matter, namely filter cake fragments 4, to pass through the slot 3 and to lodge on the inner screen wire 6 without completely covering the wire screen area. The balance of the mudsheath, shown at 7, will tend to remain deposited on the outside of the undercut tube 2, whereas the fluid flow takes place along the dotted lines shown in the drawing. Accordingly, the undercut should have a wide angle, such as 30° to 60° to a radial line, depending on the thickness of the tube 2. Only enough of the inside wall of the tube 2 need be left to permit the wire spacing ribs to rest on the original inside pipe diameter and thus to give the necessary support to the thrust from the wires, as will be explained hereinbelow.

The tube 2 is fitted at each end with means such as the threads 8 for connection into a pipe or casing string, or may be provided with any other desired coupling means.

The outer slotted tube 2 is fitted with an inner wire-wrapped screen or strainer member 10, which is formed as shown in Figs. 4 and 5.

A form or core, such as a tube or a solid cylindrical mandrel 10 is mounted between supports 12 and 13, being, if desired, rotatably held therebetween. Spacing bars or rods 15 are then tacked or otherwise held to the form 10, and a wire 6 is wrapped therearound, for example, by rotating the cylindrical core between its supports. The strainer wire is then fused, that is, welded, spot-welded or brazed to the spacing bars every time it passes over said bars, and the operation is continued until the whole length is properly wire-wound.

The stresses set up in the wire during the winding and welding or brazing process are then relieved by subjecting the wound screen to heating, for example, by means of a welding torch, as shown at 18.

One of the spacing bars or ribs 15, which may, if desired, have a somewhat greater width than the other ribs, as shown at 15a, is then longitudinally cut by means of a cutting torch or saw 17, and the screen comprising the spacing bars 15 and the wiring 6 is removed from the form 10. Since the resiliency and the spring effect of the tightly wound wire causes the split screen, shown in transverse cross-section in Fig. 6, to open at this moment, it is held together by means of suitable clamps, and is introduced inside the outer tubular member 2 before said clamps may be removed. The wire-wound strainer is positioned within the outer tubular shield member 2 in such a manner that the spacing bars 15 register with the intervals between the undercut slots 3, and thus give rigidity to the wire structure without obstructing the fluid flow. The inner screen is then forced into close contact with the walls of the outer tubular member due to the spring effect of the wires, and the screen assembly assumes its final form, as shown in cross-section in Fig. 2. It will be seen that in this manner, although no support for the screen wires is actually provided behind said wires, the load carrying capacity of the screen is obtained by reason of the arch effect and the strength thus given to the wire tightly wrapped inside the tubular member 2. In other words, although the spacing bars 15 do not constitute a support for the wires against the collapsing loads found in an oil well, these bars maintain the wires fixed thereto in proper spacing, and force said wires to act in coordination with each other to provide the arch strength necessary to resist collapse forces, the spacing bars being in turn supported by the spring pressure of the wires against the solid intervals between the undercut lots of the outer tubular shield member.

It is understood that the slots in the outer tubular shield member, instead of being vertical, may be made along horizontal or helically slanting lines, this arrangement resulting in the same support for the inner strainer member and its spacing bars.

What is claimed is:

1. A well screen comprising an outer tubular member having undercut inwardly diverging slots therethrough, and an inner member adapted to be inserted within said outer member, said inner member comprising a cylindrical straining surface formed of helically wound wire having a plurality of longitudinal spacing bars fixedly attached to the inner side thereof, said helically wound wire and one of said spacing bars being longitudinally split along the total length thereof, whereby said inner member is forced into firm contact with the inner walls of the outer member by the expanding spring action of said wires.

2. A well screen comprising an outer tubular member having therethrough inwardly diverging slots undercut at an angle of from 30 to 60 degrees to a radial line, and an inner cylindrical wire strainer adapted to be inserted within said tubular member, the wires forming said strainer having a plurality of circumferentially spaced longitudinal spacing bars fixedly attached to the inner face thereof, said inner strainer being split throughout its length along a longitudinal plane passing through one of said spacing bars, and being pressed against said outer tubular member by the resilient action of said wires.

3. A well screen comprising an outer perforated tubular member, and an inner cylindrical member arranged within said outer tubular member, said inner member comprising a frame structure made up of a plurality of circumferentially spaced elements and a resilient wire strainer cylindrically wound about said frame structure and fixedly attached thereto, said frame structure and said wire strainer being split throughout the whole length of said inner member along a line coaxial therewith, said cylindrical inner member being maintained expanded against said tubular outer member by the spring action of said resilient wire strainer.

BESSIE MAY COLLINS,
*Executrix of the Estate of Donald B. Collins, Deceased.*

REFERENCES CITED

The following references are of record in the file of this patent:

UNITED STATES PATENTS

| Number | Name | Date |
|---|---|---|
| 56,355 | Brewer et al. | July 17, 1866 |
| 2,344,909 | Williams et al. | Mar. 21, 1944 |
| 1,979,740 | Hamm | Nov. 6, 1934 |
| 2,183,308 | Dooley | Dec. 12, 1939 |
| 1,202,515 | Hardin et al. | Oct. 24, 1916 |
| 1,305,915 | Mack | June 3, 1919 |
| 2,046,458 | Johnson | July 7, 1936 |
| 2,046,459 | Johnson | July 7, 1936 |
| 2,312,415 | Jens | Mar. 2, 1943 |
| 2,327,687 | Williams | Aug. 24, 1943 |